United States Patent
Brandt et al.

(10) Patent No.: US 6,396,552 B1
(45) Date of Patent: May 28, 2002

(54) LIQUID CRYSTAL DISPLAY HAVING LIGHT DEFLECTING ELEMENT ON A SURFACE OF A SUBSTRATE, FACING THE LIQUID CRYSTAL CELL

(75) Inventors: Peter Brandt, Aschaffenburg; Dietmar Tippl, Kelkheim, both of (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/590,765

(22) Filed: Jun. 8, 2000

(30) Foreign Application Priority Data

Jan. 5, 1999 (DE) ............................. 100 00 300
Jun. 11, 1999 (DE) ........................... 199 26 797

(51) Int. Cl.⁷ .......................................... G02F 1/1335
(52) U.S. Cl. ...................................... 349/63; 349/160
(58) Field of Search ............................. 349/62, 63, 61, 349/64, 65, 158, 160, 112

(56) References Cited

U.S. PATENT DOCUMENTS

| | | | | |
|---|---|---|---|---|
| 5,211,463 A | * | 5/1993 | Kalmanash | 362/26 |
| 5,341,231 A | * | 8/1994 | Yamamoto et al. | 359/49 |
| 5,808,713 A | * | 9/1998 | Broer et al. | 349/98 |
| 6,163,351 A | * | 12/2000 | Nakayama | 349/61 |

FOREIGN PATENT DOCUMENTS

| | | |
|---|---|---|
| DE | 3123369 | 2/1983 |
| DE | 19803205 | 8/1998 |
| DE | 19800028 | 7/1999 |
| EP | 0545705 | 6/1993 |
| EP | 0886171 | 12/1998 |
| EP | 0924549 | 6/1999 |
| EP | 0957392 | 11/1999 |
| EP | 0992837 | 4/2000 |
| GB | 1417958 | 12/1975 |
| WO | 9963394 | 12/1999 |

* cited by examiner

Primary Examiner—Toan Ton
Assistant Examiner—Andrew Schechter
(74) Attorney, Agent, or Firm—Martin A. Farber

(57) ABSTRACT

In a liquid crystal display (1), a laterally arranged light coupling surface (2) permits the active illumination of the liquid crystal display (1) by a light source (3). For this purpose, the liquid crystal display (1) has a light deflecting element (7) which deflects the incident optical radiation in the direction of a liquid crystal cell (5). The light polarized by means of a rear polarization filter (9) is reflected at a rear, reflective element (10) and deflected into the liquid crystal cell (1). The segmented display is therefore produced on a front side (14) of the liquid crystal display (1), provided with a front polarization filter (13). By contrast with known liquid crystal displays having a transflector, it is thereby possible substantially to reduce a possible color deviation and the limited readability associated therewith. At the same time, the cost of production and the overall space required are substantially reduced.

9 Claims, 1 Drawing Sheet

U.S. Patent
May 28, 2002
US 6,396,552 B1
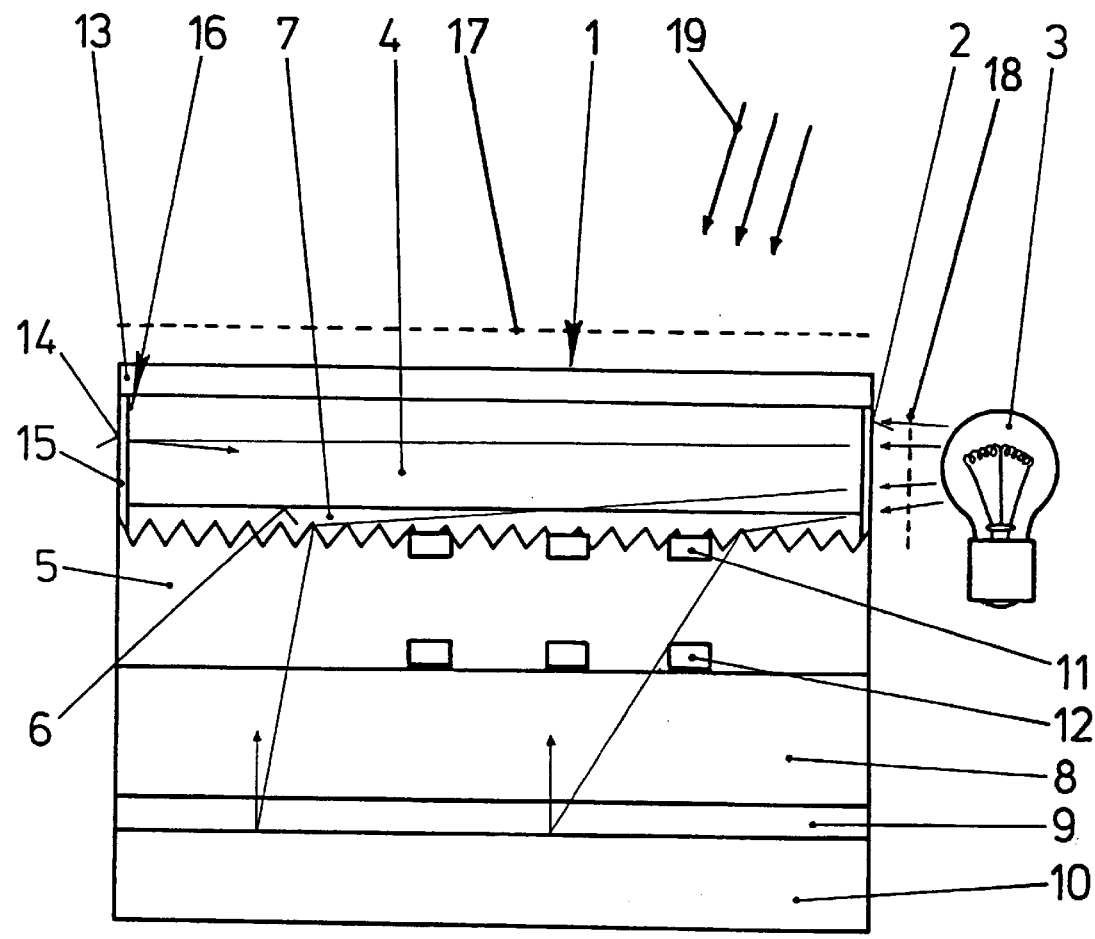

LIQUID CRYSTAL DISPLAY HAVING LIGHT DEFLECTING ELEMENT ON A SURFACE OF A SUBSTRATE, FACING THE LIQUID CRYSTAL CELL

FIELD AND BACKGROUND OF THE INVENTION

The invention relates to an illuminable liquid crystal display, in particular in a motor vehicle, having a front polarization filter, a rear polarization filter and a liquid crystal cell, enclosed by means of two substrates respectively connected to electrodes, and a reflective element arranged behind the rear polarization filter.

Such a liquid crystal display is used in practice in order, on the one hand, to achieve a display in daytime operation by means of the incident ambient light (reflective operation), and on the other hand to enable an active illumination in nighttime operation by means of a light source. For this purpose, as transflector the reflective element has a settable transmission, with the result that the incident ambient light is reflected but, at the same time, the light emanating from the light source—except for an unavoidable attenuation dependent on the transmission of the transflector—can be irradiated unimpeded from the rear side of the transflector. The possibility thus created of setting a desired brightness as a function of the ambient brightness by means of the light source also always ensures a brightness sufficient for reading the liquid crystal display in conjunction even with a variable ambient brightness.

However, it has proved to be disadvantageous in the prior art described that a variation in the reflective and/or transmissive properties of the reflective element is simultaneously associated with a variation in the color spectrum too. This can give rise to color distortions which impair the readability of the liquid crystal display.

SUMMARY OF THE INVENTION

The invention is therefore based on the problem of creating a liquid crystal display of the type mentioned at the beginning which minimizes color distortions as a consequence of switching from reflective to transflective or transmissive operation of the liquid crystal display. In particular, the readability of the liquid crystal display is also to be improved in this case.

This problem is solved according to the invention by virtue of the fact that the liquid crystal display has a light deflecting element for redirecting in the direction of the liquid crystal cell light laterally incident in a light coupling surface of the liquid crystal display. As a result, in the case of active illumination the reflective element will not require a transflective property, since irradiated light from a light source need not pass through the reflective element, and color distortions are thereby minimized. In this case, for the purpose of active illumination the light is fed, for example by means of an optical conductor, to the light coupling surface and redirected on the light deflecting element such that just like the ambient light in daytime operation it is reflected at the reflective element, designed as a mirror, for example, and radiated into the liquid crystal cell. In this case, there is also at the same time a substantial reduction in the brightness losses associated with the use of a transflector. Furthermore, it is possible in this case to achieve a compact, in particular very flat design in which, in addition, it is also possible to dispense with an expensive control unit for the reflective element. Owing to the compactness and low weight of the liquid crystal display according to the invention, the latter is suitable, in particular, for use in motor vehicles, since the aims of effective use of space and maximum weight reduction are regarded as imperative, particularly with modern vehicles.

The light deflecting element and the light coupling surface can be arranged on a separate component which is added depending on the individual requirements placed on the liquid crystal display. Another particularly favorable embodiment of the invention results, by contrast, when the light deflecting element is arranged on a surface, facing the liquid crystal cell, of at least one of the two substrates. This eliminates an additional component, with the result that the overall space required can be further reduced. In this case, the substrate serves simultaneously as optical conductor for the optical radiation coupled in by means of the light coupling surface, and thus permits a smooth light distribution with uniform brightness.

A particularly advantageous development of the invention results in this case by virtue of the fact that the light deflecting element is arranged on a side of the rear polarization filter averted from a viewer of the liquid crystal display. Consequently, the light is deflected directly in the direction of the front side of the liquid crystal display, so that no redirection of the light on the reflective elements is required in actively illuminated operation. The individual components of the liquid crystal display are passed by the coupled-in light only respectively in one direction in this case, thus permitting further reduction in possible brightness losses.

A particularly advantageous refinement of the invention results when one of the substrates has the light coupling surface, and when the light coupling surface is arranged on an end face of the substrate having the light coupling surface. In this case, the corresponding substrate simultaneously permits as an integral component on the one hand the coupling of additional optical radiation by means of the light coupling surface, and on the other hand the unhindered passage of the ambient brightness entering through the front side of the liquid crystal display. A substrate designed in such a way can therefore be exchanged without difficulty for a conventional substrate and therefore does not require any expensive new design. Further embodiments in which both substrates are fitted with corresponding light coupling surfaces and light deflecting elements permit illumination of optionally different brightness, for example.

Another particularly favorable development of the invention results when an end face of the liquid crystal display opposite the light coupling surface is provided with a reflector. Consequently, brightness losses owing to the uncontrolled escape of the coupled-in light at a side averted from the light coupling surface can be prevented. Such a mirror surface, designed as a coating, for example, therefore permits a further improvement in efficiency in the case of active illumination. Further lateral surfaces and also the edge surfaces projecting beyond a display surface of the liquid crystal display can additionally also be fitted in this case with such a reflector.

A particular simple embodiment of the invention in this case is one in which the light deflecting element is designed as a structured surface. A light deflecting element designed in such a way essentially permits unchanged external dimensions of the liquid crystal display. In this case, a structured surface designed, for example, as a microstructure simultaneously prevents local differences in brightness and therefore leads to a readability that is further improved. The structured surface can also be designed for this purpose as a texture or lens structure, for example, and be arranged both on the surface and in the interior of a transparent element.

By means of an optical conductor, it is possible to radiate into the light coupling surface comparatively bright ambient light which is not directly accessible to the liquid crystal display, or the light of independent illuminating units. A particularly advantageous development of the invention is, by contrast, also provided when the liquid crystal display has a light source radiating into the light coupling surface. Such a light source permits the required intensity of illumination to be adapted optimally in accordance with the respectively prevailing operating conditions. For this purpose, the light source can, for example, also be electronically dimmable, in order thus to permit a smooth transition between passive illumination by means of ambient brightness and active illumination by means of the light source.

A particularly well suited development of the invention results in this case by virtue of the fact that the light source is a discharge lamp. Because of its strong brightness in simultaneous conjunction with comparatively low thermal emission, the discharge lamp permits a readability even in the case of negative display of the liquid crystal display in which the driven segments appear in bright relief against the otherwise dark background.

By contrast, another advantageous development of the invention is achieved when the light source has a light-emitting diode (LED). Owing to the low power consumption and the longevity of a liquid crystal display of such design, it is also possible to use it away from the permanent line supply. Use is possible in this case, for example, with portable units and units operated by battery or rechargeable battery. The light-emitting diode (LED) is suitable in this case chiefly for positive display, in which the driven segments are displayed as darkened surfaces on the otherwise brightly illuminated background.

In accordance with another advantageous development of the invention, the color distortions of the liquid crystal display as a consequence of the switching from reflective to transflective or transmissive operation can be virtually completely excluded in wide limits when the color spectrum of the light source is adapted to the color spectrum of the incident light falling into the liquid crystal display. Since the color spectrum of the incident light, which usually concerns ambient brightness (that is to say sunlight), can vary as a function of season and time of day, for example, it is not possible under all conditions to ensure with the aid of a light source having a fixed color spectrum that there is an identical correspondence between its color spectrum and that of the incident light. It would be possible to provide a remedy here by providing that the color spectrum of the light source can be set, but this is very complicated and cost intensive. However, it is possible to assume an average color spectrum, constant within wide limits, of the incident light, with the result that the color distortions can be excluded for virtually all relevant applications in the event of adaptation of the light source thereto.

In accordance with another development of the invention, it is also particularly advantageous when a spectral filter is arranged upstream of the front polarization filter and/or between the light source and the light coupling surface. The color spectrum of the incident light and/or of the light source is thereby established in a simple way, and color distortions of the display are thereby reliably excluded.

The invention permits various embodiments.

BRIEF DESCRIPTION OF THE DRAWINGS

One of these embodiments is represented in the sole figure of the drawing for the purpose of further illustrating the basic principle of the invention, and is described below.

DETAILED DESCRIPTION OF THE PREFERRED EMBODIMENTS

The drawing shows a side view of the liquid crystal display 1 installed in an instrument panel (not illustrated further here) or center console of a motor vehicle. The liquid crystal display 1 has a light source 3 which radiates laterally into a light coupling surface 2 and which permits active illumination for displays of the liquid crystal display 1 in conjunction with inadequate ambient light. For this purpose, the light emanating from the light source 3 firstly strikes a substrate 4, which is designed as an optical conductor and is provided with a light deflecting element 7 on its surface 6 facing a liquid crystal cell 5. This light deflecting element 7 designed as a microstructure element deflects the incident light, which subsequently firstly falls through a further, rear substrate 8 and a rear polarization filter 9. The light is reflected at a reflective element 10 arranged behind the rear polarization filter 9 and subsequently radiates in the reverse direction as polarized light into the liquid crystal cell 5. Two electrodes 11, 12 respectively connected to the two substrates 4, 8 permit liquid crystal molecules (not illustrated) to be orientated in accordance with the principle, known per se, of applying electric voltage and, by means of a front polarization filter 13 on a front side 14 of the liquid crystal display 1, depending on the driving mode these molecules thus permit a visible, bright or opaque display of a respective segment to become recognizable. In order to keep the brightness losses of the light source 3 which radiates into the light coupling surface 2 and is designed as a discharge lamp as low as possible, an end face 15 of the substrate 4 is provided with a reflector 16 which prevents the undesired escape of the light. As a result, by contrast with a known transflective operation the overall height of the liquid crystal display 1 is substantially reduced, on the one hand, and on the other hand color distortions which are unavoidable when a transflector is used are virtually excluded.

It is further to be seen from the drawing that in this exemplary embodiment a spectral filter 17, also denoted as a wavelength filter, is arranged upstream of the front polarization filter 13, that is to say on the side of the liquid crystal display 1 facing a viewer. Incident light 19, illustrated symbolically by three arrows, which falls into the liquid crystal display 1 and is usually formed by ambient brightness, thereby penetrates the spectral filter 17. Also arranged between the light source 3 and the light coupling surface 2 is a further spectral filter 18 which is penetrated by the light emitted by the light source 3. The spectral filters 17, 18 tune the color spectra of the incident light 19 and the light source 3 to one another such that no color distortions of any sort occur, irrespective of whether the incident light 19 or the light source 3 is used for display purposes on the liquid crystal display 1.

What is claimed is:

1. An illuminable liquid crystal display having a front polarization filter, a rear polarization filter and a liquid crystal cell, enclosed by means of two substrates respectively connected to electrodes, and a reflective element arranged behind the rear polarization filter, wherein the liquid crystal display (1) has a light deflecting element (7) for redirecting in direction of the liquid crystal cell (5) light laterally incident in a light coupling surface (2) of the liquid crystal display (1), wherein the light deflecting element (7) is arranged on a surface (6), facing the liquid crystal cell (5), of at least one of said two substrates (4, 8).

2. The liquid crystal display as claimed in claim 1, wherein one of the substrates (4, 8) has said light coupling surface (2), and wherein the light coupling surface (2) is arranged on an end face (15) of the substrate (4, 8) having the light coupling surface (2).

3. The liquid crystal display as claimed in claim 1, wherein an end face (15) of the liquid crystal display (1) opposite the light coupling surface (2) is provided with a reflector (16).

4. The liquid crystal display as claimed in claim 1, wherein the light deflecting element (7) is formed as a structured surface.

5. The liquid crystal display as claimed in claim 1, wherein the liquid crystal display (1) has a light source (3) radiating into the light coupling surface (2).

6. The liquid crystal display as claimed in claim 5, wherein said light source (3) is a discharge lamp.

7. The liquid crystal display as claimed in claim 5, wherein said light source has a light-emitting diode (LED).

8. The liquid crystal display as claimed in claim 5, wherein the color spectrum of the light source (3) is adapted to the color spectrum of the incident light (19) falling into the liquid crystal display.

9. The liquid crystal display as claimed in claim 1, wherein a spectral filter (17; 18) is arranged upstream of the front polarization filter (13) and/or between a light source (3) and the light coupling surface (2).

* * * * *